(12) United States Patent
Dasgupta et al.

(10) Patent No.: US 11,250,313 B2
(45) Date of Patent: Feb. 15, 2022

(54) AUTONOMOUS TRADING WITH MEMORY ENABLED NEURAL NETWORK LEARNING

(71) Applicant: INTERNATIONAL BUSINESS MACHINES CORPORATION, Armonk, NY (US)

(72) Inventors: Sakyasingha Dasgupta, Shinagawa-ku (JP); Rudy R. Harry Putra, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 645 days.

(21) Appl. No.: 16/258,919

(22) Filed: Jan. 28, 2019

(65) Prior Publication Data

US 2020/0242449 A1    Jul. 30, 2020

(51) Int. Cl.
| | |
|---|---|
| *G06N 3/04* | (2006.01) |
| *G06Q 40/04* | (2012.01) |
| *G06F 17/18* | (2006.01) |
| *G06F 5/06* | (2006.01) |

(52) U.S. Cl.
CPC ............ *G06N 3/0472* (2013.01); *G06F 5/06* (2013.01); *G06F 17/18* (2013.01); *G06N 3/0454* (2013.01); *G06Q 40/04* (2013.01)

(58) Field of Classification Search
CPC ...... G06N 3/0472; G06N 3/0454; G06F 5/06; G06F 17/18; G06Q 40/04
See application file for complete search history.

(56) References Cited

U.S. PATENT DOCUMENTS

| | | | |
|---|---|---|---|
| 2017/0006135 A1* | 1/2017 | Siebel | H04L 67/2833 |
| 2017/0364998 A1 | 12/2017 | Rivtis et al. | |
| 2018/0197079 A1 | 7/2018 | Dasgupta et al. | |

(Continued)

FOREIGN PATENT DOCUMENTS

| | | |
|---|---|---|
| CN | 106845681 | 6/2017 |
| JP | 2016-71697 | 5/2016 |

OTHER PUBLICATIONS

Bao ey et al., "A Deep Learning Framework for Financial Time Series Using Stacked Autoencoders and Longshort Term Memory", PLOS One | https://doi.org/10.1371/journal.pone.0180944, Jul. 2017, pp. 1-24.

(Continued)

*Primary Examiner* — Raymond L Nimox
(74) *Attorney, Agent, or Firm* — Tutunjian & Bitetto, P.C.; Randall Bluestone (57) ABSTRACT

A computer-implemented method is provided for autonomously making continuous trading decisions for assets using a first eligibility trace enabled Neural Network (NN). The method includes pretraining the first eligibility trace enabled NN, using asset price time series data, to generation predictions of future asset price time series data. The method further includes initializing a second eligibility trace enabled NN for reinforcement learning using learned parameters of the first eligibility trace enabled NN. The method also includes augmenting state information of the second eligibility trace enabled NN for reinforcement learning using an output from the first eligibility trace enabled NN. The method additionally includes performing continuous actions for trading assets at each of multiple time points.

20 Claims, 9 Drawing Sheets

(56) References Cited

U.S. PATENT DOCUMENTS

| | | | |
|---|---|---|---|
| 2018/0247191 A1* | 8/2018 | Katz | G06Q 20/065 |
| 2018/0276541 A1* | 9/2018 | Studnitzer | G06N 3/0454 |
| 2019/0019082 A1 | 1/2019 | Dasgupta et al. | |
| 2019/0034892 A1* | 1/2019 | Smith | G06N 5/043 |
| 2020/0117690 A1* | 4/2020 | Tran | G06F 16/90332 |

OTHER PUBLICATIONS

Dasgupta et al., "Nonlinear Dynamic Boltzmann Machines for Time-Series Prediction", Proceedings of the Thirty-First AAAI Conference on Artificial Intelligence (AAAI-17), Feb. 2017, pp. 1833-1839.

Dasgupta et al., Regularized Dynamic Boltzmann Machine with Delay Pruning for Unsupervised Learning of Temporal Sequences, arXiv:1610.01989v1 [cs.LG] Sep. 22, 2016, 6 pages.

Shah, "Automated Stock Market Trading System", Department of Computer Science and Engineering Institute of Technology NIRMA University, Ahmedabad-382481, May 2015, 49 pages.

* cited by examiner

AUTONOMOUS TRADING WITH MEMORY ENABLED NEURAL NETWORK LEARNING

BACKGROUND

Technical Field

The present invention generally relates to data processing, and more particularly to autonomous trading with memory enabled neural network learning.

Description of the Related Art

Dynamic Boltzmann Machines (DyBM) has been proposed as a neural network with First-In, First-Out (FIFO) queues that provide it with a long term memory of the previous history of time series data. A DyBM has been shown to be effective in learning to predict high-dimensional time series data using its memory, for both binary and real-valued data. A DyBM has also been shown to be able to perform reinforcement learning that can control the binary discrete actions of an agent in a partially observable environment.

Future prediction of high-dimensional financial time series requires the ability to learn by accessing a memory storing previous history. Trading (taking actions for buying, selling or holding) based on financial time series data (e.g., stock prices, Bitcoin values, etc.) is carried out by humans and requires skilled domain knowledge. Creating an autonomous trading agent is a difficult control problem requiring the ability to learn in a partially observable environment. Hence, there is a need for a technique for automous trading with memory enabled neural network learning.

SUMMARY

According to an aspect of the present invention, a computer-implemented method is provided for autonomously making continuous trading decisions for assets using a first eligibility trace enabled Neural Network (NN). The method includes pretraining the first eligibility trace enabled NN, using asset price time series data, to generation predictions of future asset price time series data. The method further includes initializing a second eligibility trace enabled NN for reinforcement learning using learned parameters of the first eligibility trace enabled NN. The method also includes augmenting state information of the second eligibility trace enabled NN for reinforcement learning using an output from the first eligibility trace enabled NN. The method additionally includes performing continuous actions for trading assets at each of multiple time points.

According to another aspect of the present invention, a computer program product is provided for autonomously making continuous trading decisions for assets using a first eligibility trace enabled Neural Network (NN). The computer program product includes a non-transitory computer readable storage medium having program instructions embodied therewith. The program instructions are executable by a computer to cause the computer to perform a method. The method includes pretraining the first eligibility trace enabled NN, using asset price time series data, to generation predictions of future asset price time series data. The method further includes initializing a second eligibility trace enabled NN for reinforcement learning using learned parameters of the first eligibility trace enabled NN. The method also includes augmenting state information of the second eligibility trace enabled NN for reinforcement learning using an output from the first eligibility trace enabled NN. The method additionally includes performing continuous actions for trading assets at each of multiple time points.

According to yet another aspect of the present invention, a computer processing system for autonomously making continuous trading decisions for assets using a first eligibility trace enabled Neural Network (NN). The computer processing system includes a memory for storing program code. The computer processing system further includes a processor device for running the program code to pretrain the first eligibility trace enabled NN, using asset price time series data, to generation predictions of future asset price time series data. The processor device further runs the program code to initialize a second eligibility trace enabled NN for reinforcement learning using learned parameters of the first eligibility trace enabled NN. The processor device also runs the program code to augment state information of the second eligibility trace enabled NN for reinforcement learning using an output from the first eligibility trace enabled NN. The processor device additionally runs the program code to perform continuous actions for trading assets at each of multiple time points.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to autonomous trading with memory enabled neural network learning.

In one or more exemplary embodiments, a method interchangeably referred to herein as "AutoTrader" is provided to augment the state information of a memory enabled neural network such as a DyBM with another DyBM that predicts future financial timeseries and then carries out reinforcement learning (RL) to make optimal trading decisions that autonomously maximize expected future return. Unlike previous DyBM RL, AutoTrader can make continuous actions. These and other advantages and features of the present invention are readily determined by one of ordinary skill in the art, given the teachings of the present invention provided herein, while maintaining the spirit of the present invention.

Hence, in an embodiment, the present invention can autonomously make continuous trading decisions to hold, buy, or sell stocks with an eligibility trace enabled neural network by augmenting its state with another eligibility trace enable neural network predicting future time points of the input.

In an embodiment, the present invention can use an eligibility trace enabled neural network (such as, for example, but not limited to, a Dynamic Boltzmann Machine) or an ensemble of such networks to pre-train on stock price time series data and predict future time series data. In an embodiment, the learned parameters of this network or one among the ensembles are used to initialize another eligibility trace enabled neural network for reinforcement learning (such as, for example, a dynamic Boltzmann machine).

In an embodiment, the present invention can use the output from the first neural network/networks to augment the state information of the second neural network for reinforcement learning, and take continuous actions for buying or selling stocks at each time point.

Figure 1:
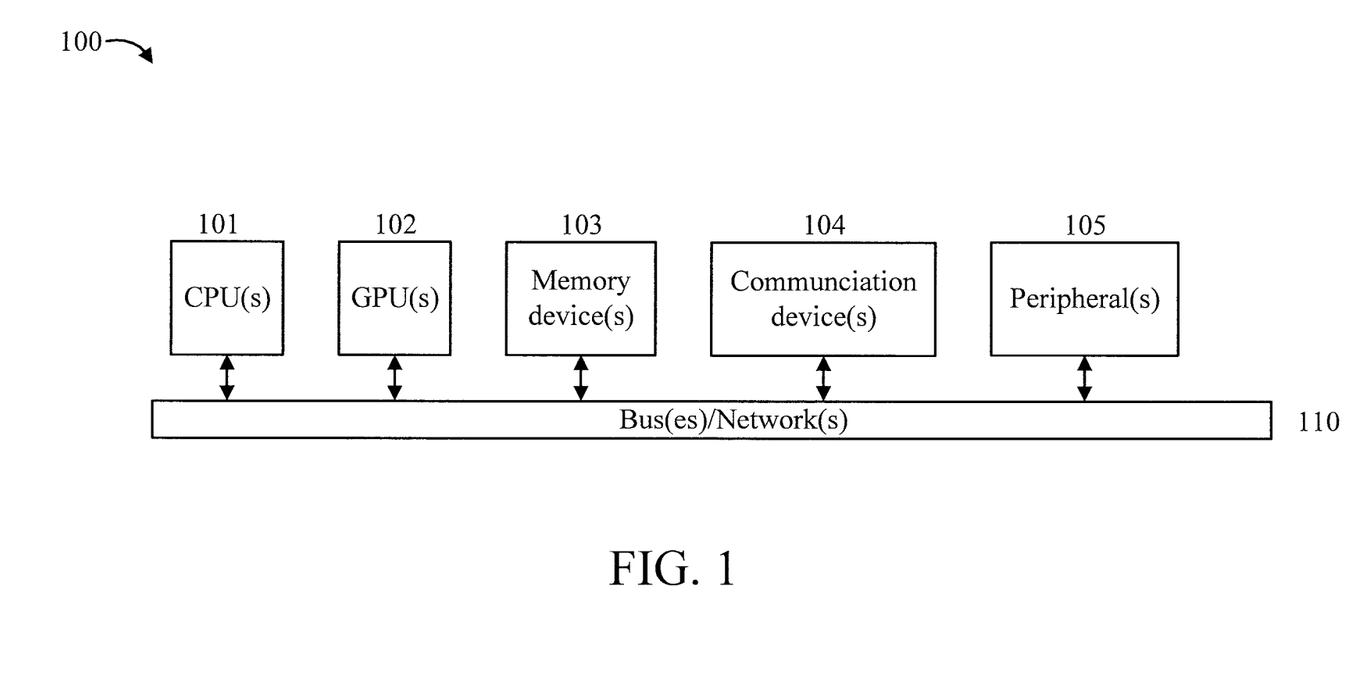
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 7-8). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

A description will now be given regarding two exemplary environments 200 and 300 to which the present invention can be applied, in accordance with various embodiments of the present invention. The environments 200 and 300 are described below with respect to FIGS. 2 and 3, respectively. In further detail, the environment 200 includes a multi-step-ahead forecast system operatively coupled to a controlled system, while the environment 300 includes a multi-step ahead forecast system as part of a controlled system. Moreover, any of environments 200 and 300 can be part of a cloud-based environment (e.g., see FIGS. 8 and 9). These and other environments to which the present invention can be applied are readily determined by one of ordinary skill in the art, given the teachings of the present invention provided herein, while maintaining the spirit of the present invention.

Figure 2:
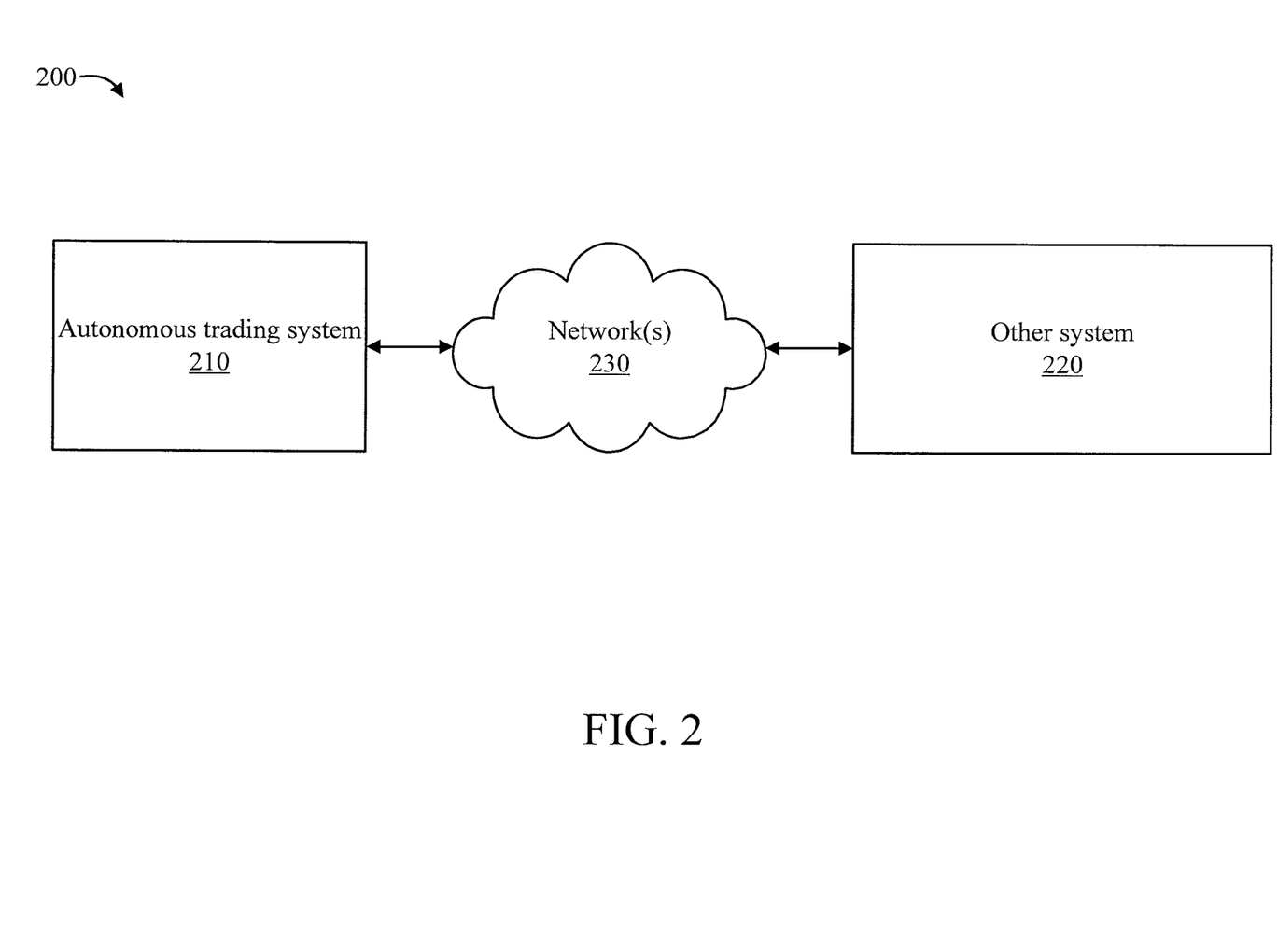
FIG. 2 is a block diagram showing an exemplary environment to which the present invention can be applied, in accordance with an embodiment of the present invention.

FIG. 2 is a block diagram showing an exemplary environment 200 to which the present invention can be applied, in accordance with an embodiment of the present invention.

The environment 200 includes an autonomous trading system (with memory enabled neural network learning) 210 and another system 220. The autonomous trading system 210 and the other system 220 are configured to enable communications therebetween. For example, transceivers and/or other types of communication devices including wireless, wired, and combinations thereof can be used. In an embodiment, communication between the autonomous trading system 210 and the other system 220 can be performed over one or more networks, collectively denoted by the figure reference numeral 230. The communication can include, but is not limited to, multi-variate time series data from the other system 220, and forecasts and action initiation control signals from the autonomous trading system 210. The other system 220 can be any type of processor-based trading related system such as, for example, but not limited to, another trading system, a banking system, a system that serves as a source of time-series data (e.g., such as stock prices, and so forth), and so forth.

The other system 220 provides data (e.g., multi-variate time series data) to the autonomous trading system 210 which uses the data to make predictions (forecasts). The autonomous trading system 210 uses past predictions it has generated in order to prediction of a future event.

In an embodiment, in order to make a prediction, the autonomous trading system 210 can use a DyBM.

The other system 220 can be controlled based on a prediction generated by the autonomous trading system 210. For example, based on a prediction that a stock is going to significantly drop at time x, a corresponding action (e.g., sell the stock) can be performed at t<x in order to avoid incurring the corresponding losses on a given stock portfolio.

It is to be appreciated that the preceding actions are merely illustrative and, thus, other actions can also be performed depending upon the implementation, as readily appreciated by one of ordinary skill in the art given the teachings of the present invention provided herein, while maintaining the spirit of the present invention.

In an embodiment, the autonomous trading system 210 can be implemented as a node in a cloud-computing arrangement. In an embodiment, a single autonomous trading system 210 can be assigned to a single controlled system or to multiple controlled systems e.g., different trading system trading different commodities, and so forth). These and other configurations of the elements of environment 200 are readily determined by one of ordinary skill in the art given the teachings of the present invention provided herein, while maintaining the spirit of the present invention.

Figure 3:
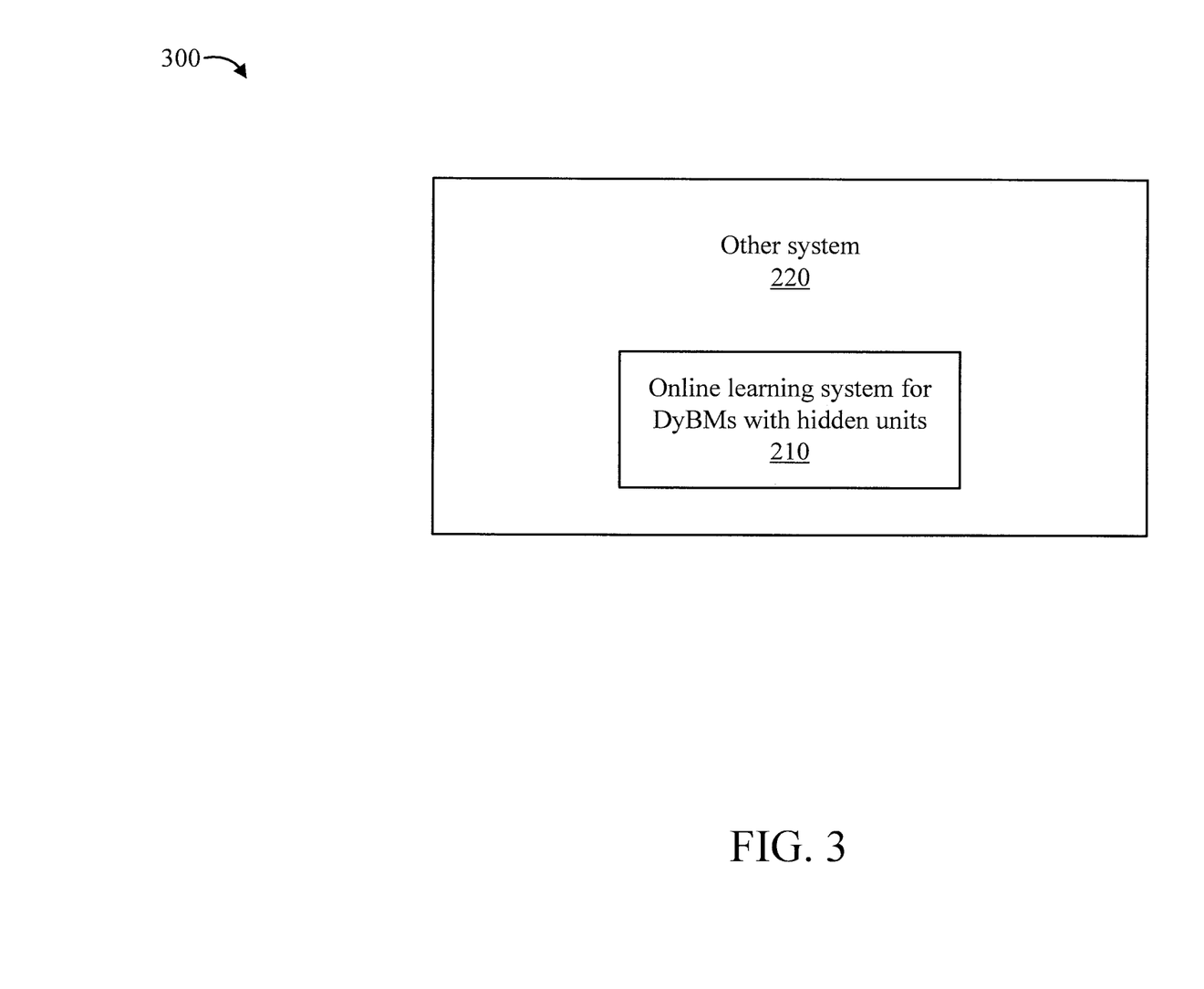
FIG. 3 is a block diagram showing another exemplary environment to which the present invention can be applied, in accordance with an embodiment of the present invention.

FIG. 3 is a block diagram showing another exemplary environment 300 to which the present invention can be applied, in accordance with an embodiment of the present invention.

The environment 300 includes a system 320 that, in turn, includes an autonomous trading system 310. One or more communication buses and/or other devices can be used to facilitate inter-system, as well as intra-system, communication. The system 320 can be any type of processor-based trading related system such as, for example, but not limited to, another trading system, a banking system, a system that serves as a source of time-series data (e.g., such as stock prices, and so forth), and so forth.

Other than system 310 being included in system 320, operations of these elements in environments 200 and 300 are similar. Accordingly, elements 310 and 320 are not described in further detail relative to FIG. 3 for the sake of brevity, with the reader respectively directed to the descriptions of elements 210 and 220 relative to environment 200 of FIG. 2 given the common functions of these elements in the two environments 200 and 300.

A DyBM includes a network of neurons and memory units. A pre-synaptic neuron is connected to a post-synaptic neuron via a FIFO queue. The spike from the pre-synaptic neuron reaches the post-synaptic neuron after a constant conduction delay. Each neuron has the memory unit for storing neural eligibility traces, which summarize the neuron's activities in the past. A synaptic eligibility trace is associated with a synapse between a pre-synaptic neuron and a post-synaptic neuron, and summarizes the spikes that have arrived at the synapse, via the FIFO queue, from the pre-synaptic neuron.

Hence, the DyBM can be viewed as fully-connected recurrent neural network with memory units and with conduction delays between units implemented in the form of fixed length first-in first-out (FIFO) queues. A spike originating at a pre-synaptic neuron (unit) travels along this FIFO queue and reaches the post-synaptic neuron after a fixed delay. The length of the FIFO queues is equal to one minus the maximum delay value.

Figure 4:
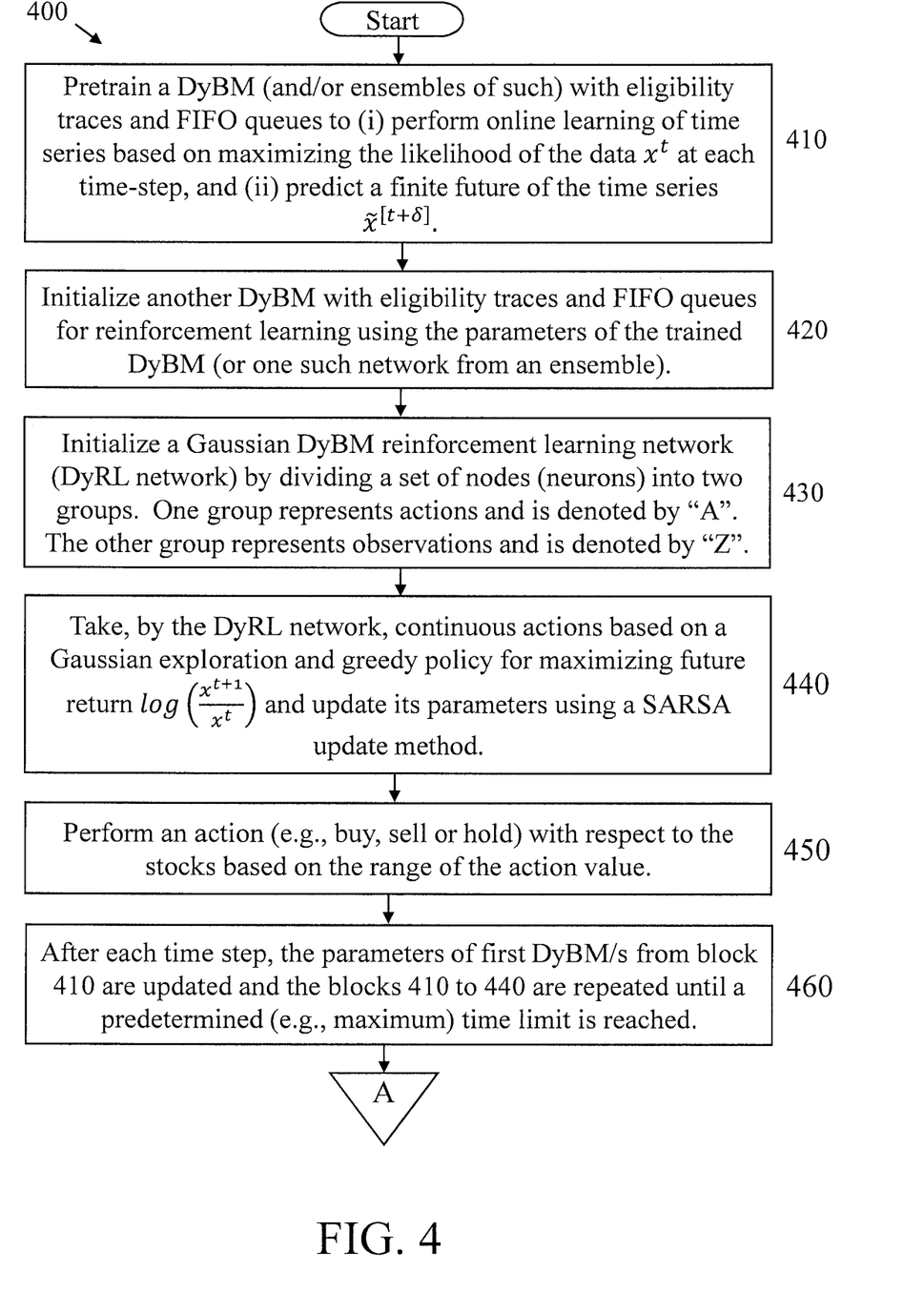
FIGS. 4-5 are flow diagrams showing an exemplary method for autonomous trading with memory enabled neural network learning, in accordance with an embodiment of the present invention.
Figure 5:
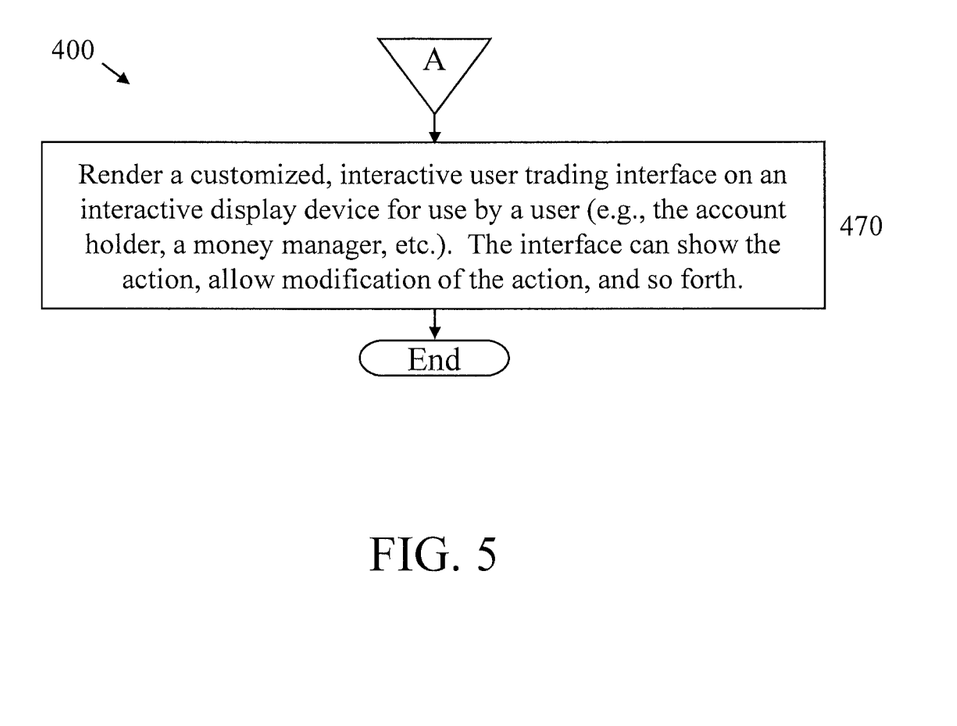

FIG. 4-5 are flow diagrams showing an exemplary method 400 for autonomous trading with memory enabled neural network learning, in accordance with an embodiment of the present invention.

At block 410, pretrain a DyBM (and/or ensembles of such) with eligibility traces and FIFO queues to (i) perform online learning of time series based on maximizing the likelihood of the data $x^t$ at each time-step, and (ii) predict a finite future of the time series $\tilde{x}^{[t+\delta]}$.

At block 420, initialize another DyBM with eligibility traces and FIFO queues for reinforcement learning using the parameters of the trained DyBM (or one such network from an ensemble).

At block 430, initialize a Gaussian DyBM reinforcement learning network (DyRL network) by dividing a set of nodes (neurons) into two groups. One group represents actions and is denoted by "A". The other group represents observations and is denoted by "Z". The DyRL is initialized and configured such that the observations of the DyRL network at each time-step include the actual time series and the predicted future time series from first DyBM network or ensembles thereof (block 410).

At block 440, take, by the DyRL network, continuous actions based on a Gaussian exploration and greedy policy for maximizing future return $$\log\left(\frac{x^{t+1}}{x^t}\right)$$

and update its parameters using a SARSA update method.

At block 450, perform an action (e.g., buy, sell or hold) with respect to the stocks based on the range of the action value.

At block 460, after each time step, the parameters of first DyBM/s from block 410 are updated and the blocks 410 to 440 are repeated until a predetermined (e.g., maximum) time limit is reached.

At block 470, s In this way, trading is optimized and user interaction is permitted to augment or modify decisions made by the system. The interaction can include a last minute interruption of an intended action deemed to be risky or meeting some other criteria for no using the intended action. The display can show the continuous actions taken in graphical form, thus transforming the output to a different form able to be readily understood by a user. Moreover, from such a visualization, the user can affect (modify) a shown trajectory in order to achieve a goal or prevent something (a bad trade, etc.) from happening. These and other variations with which a user can interact with the interface are readily determined by one of ordinary skill in the art given the teachings of the present invention provided herein, while maintaining the spirit of the present invention.

Figure 6:
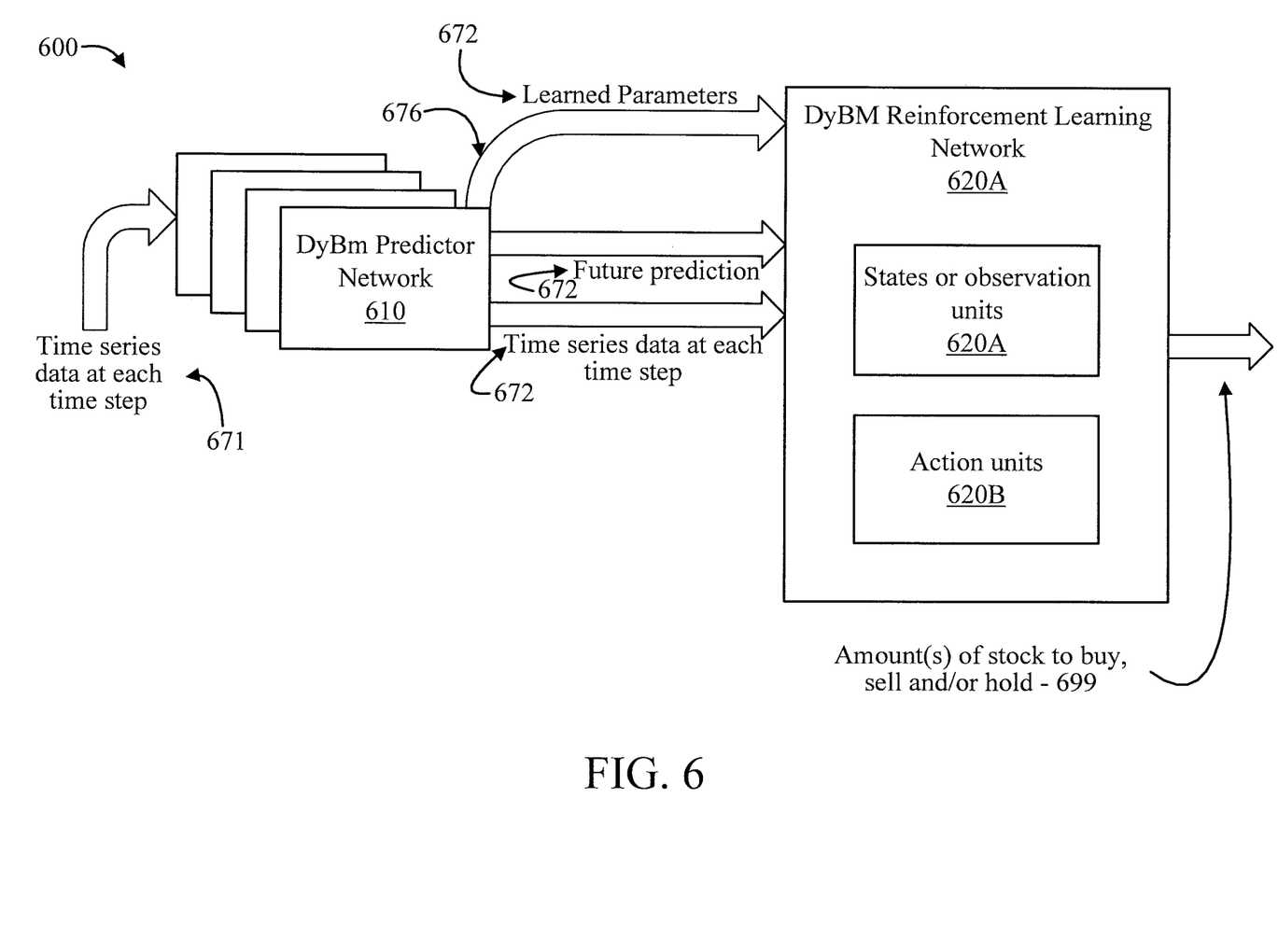
FIG. 6 is a block diagram showing an exemplary autonomous trading architecture, in accordance with an embodiment of the present invention.

FIG. 6 is a block diagram showing an exemplary autonomous trading architecture 600, in accordance with an embodiment of the present invention.

The architecture 600 includes a DyBM predictor network 610, and a DyBM reinforcement learning network 620.

The DyBM predictor network 610 is configured to receive time series data 671 at each of multiple time steps, and output learned parameters 672 in a learned parameters transfer 676.

The DyBm reinforcement learning network 620 includes a states or observation units portion 620A and an action units portion 620B. In an embodiment, the DyBM reinforcement learning network 620 is a Gaussian DyBM reinforcement learning network. The DyBM reinforcement learning network 620 receives the learned parameters 672 from the learned parameters transfer 676, a future prediction 673 from the DyBM predictor network 610, and time series data 671 at each time step, and outputs an amount(s) 699 of stock to buy, sell, and/or hold.

Figure 7:
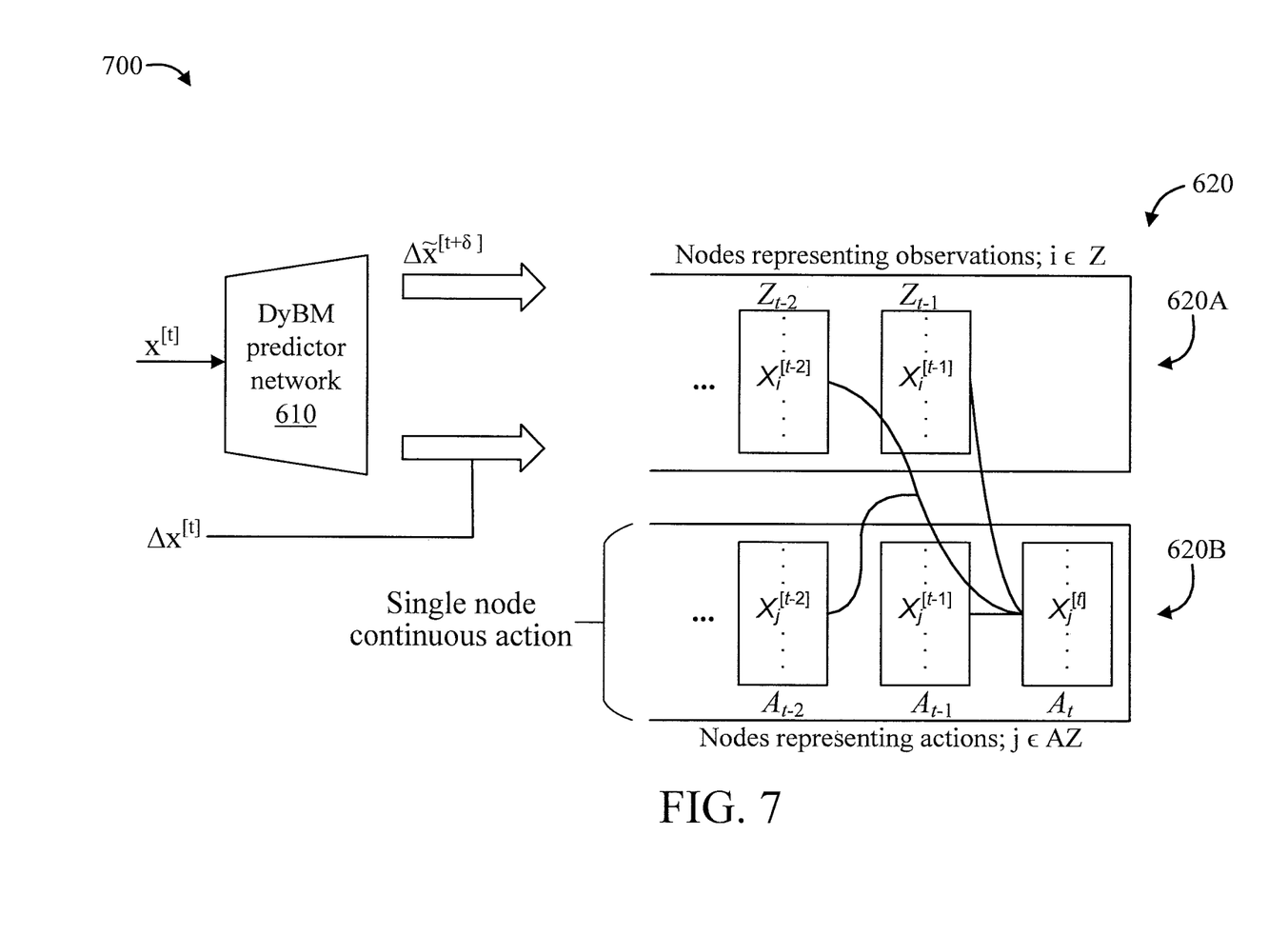
FIG. 7 is a block diagram showing another exemplary representation of the autonomous trading architecture of FIG. 6, in accordance with an embodiment of the present invention.

FIG. 7 is a block diagram showing another exemplary representation 700 of the autonomous trading architecture 600 of FIG. 6, in accordance with an embodiment of the present invention.

The DyBM predictor network 610 receives a current portfolio value as a time series input $x^t$. The DyBM predictor network 610 outputs learned parameters $\Delta \tilde{x}^{[t+\delta]}$ to the DyBM reinforcement learning network 620.

The DyBM reinforcement learning network 620 receives a prediction $\Delta x^{[t]}$.

The states or observation units portion 620A includes nodes representing observations, $i \in Z$ (e.g., $Z_{t-1}$, $Z_{t-2}$, ...). The action units portion 620B includes nodes representing actions, $j \in Z$ (e.g., $A_t$, $A_{t-1}$, $A_{t-2}$, ...). In the example of FIG. 6, the nodes $A_t$, $A_{t-1}$, $A_{t-2}$, ... represent a single node continuous action.

The time series data, input to the DyBM reinforcement learning network 620, can be made stationary by the following:

$$\Delta x^{[t]} = x^t - x^{[t-1]}.$$

The reward for reinforcement learning can be as follows:

$$R_{t+1} = \log\left(\frac{x^{[t+1]}}{x^{[t]}}\right).$$

The goal is to maximize this return over time.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
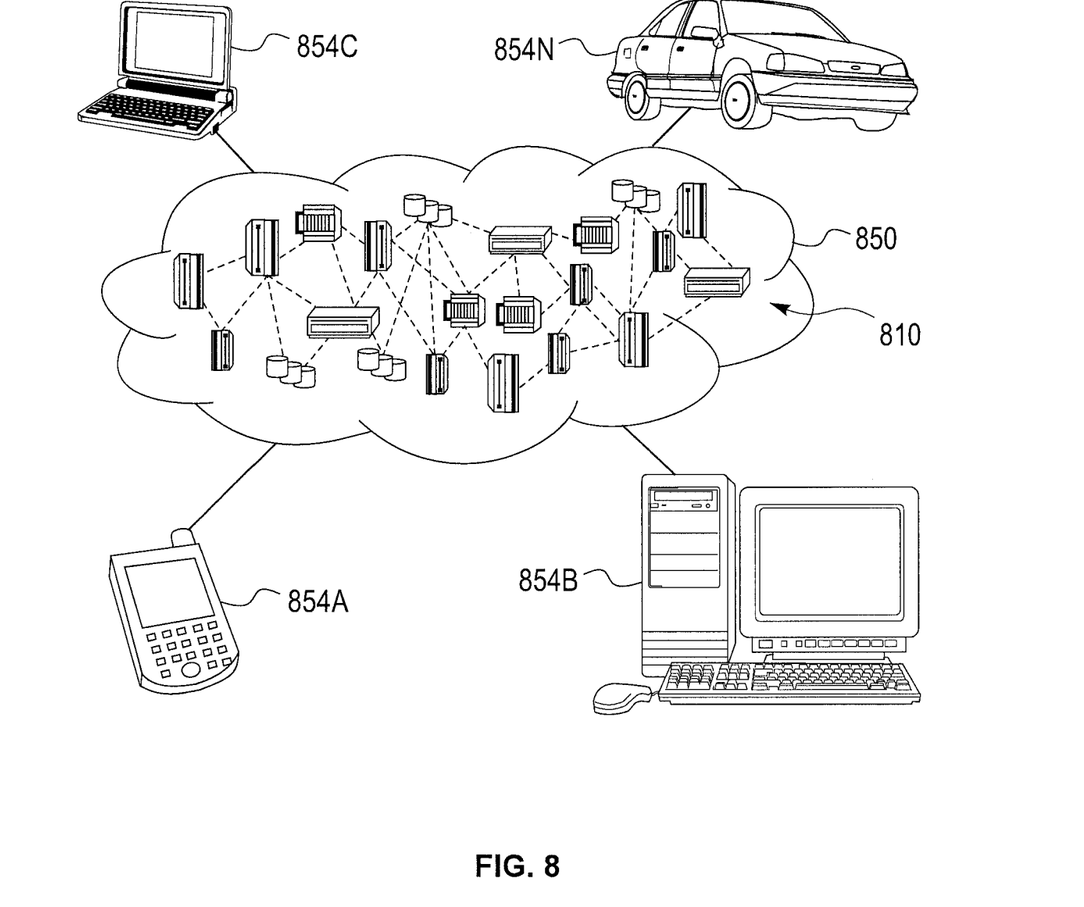
FIG. 8 is a block diagram showing an illustrative cloud computing environment having one or more cloud computing nodes with which local computing devices used by cloud consumers communicate, in accordance with an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
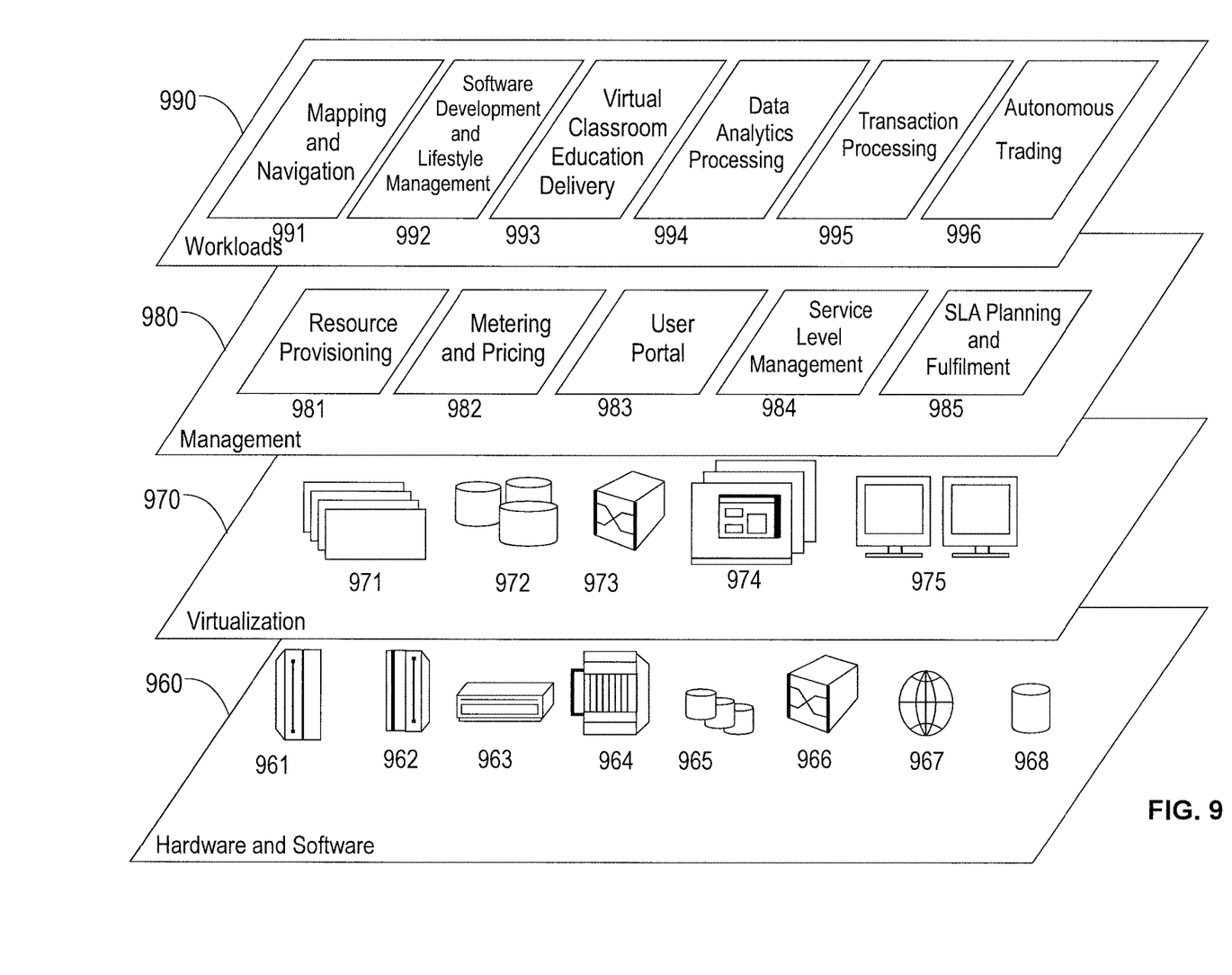
FIG. 9 is a block diagram showing a set of functional abstraction layers provided by a cloud computing environment, in accordance with an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and autonomous trading with memory enabled neural network learning 996.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for autonomously making continuous trading decisions for assets using a first eligibility trace enabled Neural Network (NN), comprising:
   pretraining the first eligibility trace enabled NN, using asset price time series data, to generation predictions of future asset price time series data;
   initializing a second eligibility trace enabled NN for reinforcement learning using learned parameters of the first eligibility trace enabled NN;
   augmenting state information of the second eligibility trace enabled NN for reinforcement learning using an output from the first eligibility trace enabled NN; and
   performing continuous actions for trading assets at each of multiple time points.

2. The computer-implemented method of claim 1, further comprising training a DyBM with eligibility traces and FIFO queues for online learning on the asset price time series data based on maximizing a likelihood of the asset price time series data at each time-step.

3. The computer-implemented method of claim 1, further comprising initializing another DyBM with eligibility traces and FIFO queues for reinforcement learning using the parameters of the trained DyBM.

4. The computer-implemented method of claim 1, wherein the first eligibility trace enabled NN comprises an ensemble of eligibility trace enabled neural networks.

5. The computer-implemented method of claim 1, wherein nodes of the second eligibility trace enabled NN, corresponding to representative neurons, are divided into two groups, wherein a first group of the two groups represents actions and a second group of the two groups represents observations.

6. The computer-implemented method of claim 5, wherein the observations comprise the asset price time series data and the predictions of future asset price time series data.

7. The computer-implemented method of claim 1, wherein the second eligibility trace enabled NN is a Gaussian eligibility trace enabled NN.

8. The computer-implemented method of claim 1, further comprising updating parameters of the second eligibility trace enabled NN using a temporal-difference error.

9. The computer-implemented method of claim 1, wherein the continuous actions are determined based on a Gaussian exploration policy for maximizing a future reward.

10. The computer implemented method of claim 1, wherein trading the assets comprises performing an action selected from the group consisting of buying and selling.

11. A computer program product for autonomously making continuous trading decisions for assets using a first eligibility trace enabled Neural Network (NN), the computer program product comprising a non-transitory computer readable storage medium having program instructions embodied therewith, the program instructions executable by a computer to cause the computer to perform a method comprising:

pretraining the first eligibility trace enabled NN, using asset price time series data, to generation predictions of future asset price time series data;

initializing a second eligibility trace enabled NN for reinforcement learning using learned parameters of the first eligibility trace enabled NN;

augmenting state information of the second eligibility trace enabled NN for reinforcement learning using an output from the first eligibility trace enabled NN; and performing continuous actions for trading assets at each of multiple time points.

12. The computer program product of claim 11, wherein the method further comprises training a DyBM with eligibility traces and FIFO queues for online learning on the asset price time series data based on maximizing a likelihood of the asset price time series data at each time-step.

13. The computer program product of claim 11, wherein the method further comprises initializing another DyBM with eligibility traces and FIFO queues for reinforcement learning using the parameters of the trained DyBM.

14. The computer program product of claim 11, wherein the first eligibility trace enabled NN comprises an ensemble of eligibility trace enabled neural networks.

15. The computer program product of claim 11, wherein nodes of the second eligibility trace enabled NN, corresponding to representative neurons, are divided into two groups, wherein a first group of the two groups represents actions and a second group of the two groups represents observations.

16. The computer program product of claim 15, wherein the observations comprise the asset price time series data and the predictions of future asset price time series data.

17. The computer program product of claim 11, wherein the second eligibility trace enabled NN is a Gaussian eligibility trace enabled NN.

18. The computer program product of claim 11, wherein the method further comprises updating parameters of the second eligibility trace enabled NN using a temporal-difference error.

19. The computer program product of claim 11, wherein the continuous actions are determined based on a Gaussian exploration policy for maximizing a future reward.

20. A computer processing system for autonomously making continuous trading decisions for assets using a first eligibility trace enabled Neural Network (NN), comprising:

a memory for storing program code; and a processor device for running the program code to pretrain the first eligibility trace enabled NN, using asset price time series data, to generation predictions of future asset price time series data;

initialize a second eligibility trace enabled NN for reinforcement learning using learned parameters of the first eligibility trace enabled NN;

augment state information of the second eligibility trace enabled NN for reinforcement learning using an output from the first eligibility trace enabled NN; and perform continuous actions for trading assets at each of multiple time points.

* * * * *